ial No. 583,889

United States Patent Office 2,821,499
Patented Jan. 28, 1958

2,821,499

METHOD FOR CONTROLLING SEA LAMPREYS (PETROMYZON MARINUS)

Vernon C. Applegate and John H. Howell, Rogers City, Mich., assignors to the United States of America as represented by the Secretary of the Interior No Drawing. Application May 9, 1956
Serial No. 583,889

7 Claims. (Cl. 167—30)

(Granted under Title 35, U. S. Code (1952), sec. 266)

The invention herein described and claimed may be manufactured or used by or for the United States of America for governmental purposes without payment of royalty thereon or therefor.

This invention relates to the control of sea lampreys (*Petromyzon marinus*), and more particularly, to the chemical treatment of the aquatic habitats in which the larval stage lives and grows during a period of from approximately four to five years.

It is the object of our invention to provide a practicable means for protecting food and game fish in the Great Lakes by rapid and substantial reduction of the sea lamprey population in those lakes. It is a further object of our invention to provide a simple and economic means for the destruction of sea lampreys in the larval stage.

It is a further object of our invention to provide a poison which will effect a substantially complete eradication of larval lampreys in a water course without causing significant harm to or mortality of game and food fish, or other desirable aquatic species. These and other objects will be apparent from the following description and claims.

The sea lamprey is an anadromous species. That is, it is a marine animal which, like certain salmon, hatches in a fresh water stream and migrates to the ocean to spend its adult life, and then comes back to fresh water to spawn. The life cycle of the sea lamprey begins in the shallow riffles of a stream. Here it passes the major portion of its life as a blind, harmless larva. Of its approximately seven-year life span, a lamprey spends only about the last eighteen months in the lakes as a parasite. At the end of that time it goes back to the stream to spawn and die.

Spawning takes place in early spring, at which time sexually matured adult lampreys move upstream seeking clear running creeks, with a gravel or sand bottom and moderately strong current. Spawning begins when the stream is over 50° F. and is completed within a few days, following which adults usually die within a few hours. A single female lamprey will deposit from 24,000 to 107,000 eggs, of which about 1% will hatch within ten to twelve days. About the twentieth day newly hatched larvae, which are then about one-fourth inch long and hardly bigger than a fine needle, issue from the nest and drift downstream until the flow becomes quite still and quiet, usually over the mud banks of the marshy regions in the lower stretches of the stream. Here the individual larva burrows into the mud bank where it spends from four to five years subsisting on microscopic organisms passing the mouth of its burrow.

After about four years of this blind and harmless existence, a striking metamorphosis occurs and the larva develops into a young sea lamprey, about seven inches in length, equipped for its adult parasitic existence with a round sucker-like mouth lined with horny teeth and a file-like tongue. A strong swimmer with excellent vision, the lamprey makes easy prey of fish much larger than itself. Once attached to the victim with its mouth it is not easily dislodged until it is satiated, or the death of the host, which is usually a matter of a few hours. Feeding on a succession of victims, the lamprey grows rapidly to a length of twelve to twenty-four inches. During the twelve to twenty months of its parasitic existence, a single adult lamprey will destroy or seriously injure over twenty pounds of fish.

Before 1921 the presence of these lampreys was known only in the St. Lawrence River and in Lake Ontario. This part of the Great Lakes is not a favorable environment and the lampreys have never been a problem. Since 1921, apparently through the Welland Canal, the sea lamprey has become established in Lake Erie and from thence has gradually extended its habitat to include Lake Huron and Lake Michigan, where conditions are particularly favorable, and has multiplied prodigiously in these two lakes. More recently it has been found in significant numbers in Lake Superior where conditions also are favorable for its life and growth. In this part of the Great Lakes system, the lamprey has adjusted itself to spending its entire life cycle in fresh water with its adult parasitic phase being spent in one of the lakes instead of in the ocean.

At the present time, sea lampreys in the Great Lakes, more especially Lakes Huron, Michigan, and Superior, are a problem of great concern to commercial and sports fishermen in the United States and Canada. In Lake Huron, for example, the catastrophe began around 1939 and within fourteen years trout had all but disappeared from that lake. The same fate began to overtake Lake Michigan's trout in 1946. The take of trout from Lake Michigan declined precipitously from a high of nearly 7,000,000 pounds in 1943 to only a few hundred pounds in 1953. With the virtual extinction of the preferred lake trout, other species, such as white fish, suckers, and walleyes, now fall prey to the lamprey.

Information concerning the lampreys' movements in the Great Lakes is meager and there appears to be no practical technique for combatting them in these large bodies of open water. Nevertheless, satisfactory and economical control of this pest may be effected during those parts of its life cycle spent in the smaller streams. Delaying or preventing the lamprey from reaching its spawning grounds during the spawning runs is a practical procedure for destroying these pests. This may be accomplished by electrical barriers which kill or repel the adults before reaching the spawning grounds, or even by mechanical barriers which delay or prevent access to the spawning grounds. The use of general poisons in the water below the spawning grounds, while effective, also destroys other fish.

Unfortunately, such methods, regardless of adverse effects upon other species of aquatic life and other shortcomings, are seriously defective in view of the time lag before the results of such control become apparent. Larval lampreys already in the streams continue to grow and develop into parasitic adults. Thus it may be as much as seven years before the lamprey population in Lake Huron or Lake Michigan shows any marked decrease after application of the control measures.

By destruction of the larvae or the young downstream migrants the population of lampreys in the Great Lakes could be substantially reduced in less than two years. The life cycle of the sea lamprey can be most satisfactorily broken in the larval stage by the application of certain chemicals. The effects of such control become apparent in less than two years. However, as in the case of the adult lampreys, such methods will be acceptable only if the chemical used is non-toxic or relatively so to desirable game and food fishes. In addition, a larvicidal agent should be substantially harmless to the various organisms which provide food for such fishes. In combatting the lamprey in the larval stage it is necessary to apply the chemical to the waters which form the habitat of such larvae and therefore to be practical as a larvicide the toxic agent must exhibit larvicidal activity in relatively high dilutions.

We have found that the ethyl, pentachlorophenyl ester of thiolcarbonic acid, having the formula

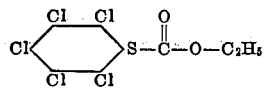

possesses outstanding lampricidal activity at extremely low concentrations. This compound is hereinafter designated as O-ethyl-S-pentachlorophenyl-thiolcarbonate. Our invention is calculated to attack and destroy lampreys during the larval stage while they are burrowed into the mud banks by establishing in the water immediately over such banks the concentration of the chemical which is lethal to the lamprey larvae. This toxic amount should be closely controlled. If the quantity of the chemical added to the water results in a sustained concentration in excess of the indicated optimum upper limit, the additional amount serves no useful purpose, increases cost of the operation, and may prove harmful to desirable species of game fish and food fish.

The following examples, which are by way of illustration and not of limitation, show the high degree of toxicity to lamprey larvae, coupled with relative inertness to higher species of desirable fish, of O-ethyl-S-pentachlorophenyl-thiolcarbonate when used in accordance with our invention.

EXAMPLE 1

O-ethyl-S-pentachlorophenyl-thiolcarbonate was evaluated for toxicity with respect to lamprey larvae and four valuable species, rainbow trout (*Salmo gairdnerii*), brown trout (*Salmo trutta*), brook trout (*Salvelinus fontinalis*), and small mouth bass (*Micropterus dolomieu*), by the following procedure.

The test animals are placed in a glass tank containing about five liters of water, maintained at 55° F. in a constant temperature bath. These tanks are provided with aeration through standard stone air-breakers.

In each run, which usually includes a number of duplicates, the test chemical is added to the water and thoroughly mixed before introducing the test animals. The test chemical is first dissolved, emulsified, or suspended in water, alcohol, acetone, or other suitable vehicle, using any conditioning agent necessary, and is added as a stock solution to the test container to provide the desired test concentration. One tank, however, serves as the control, and no chemical is added thereto, so that the fish therein are exposed only to the water and container under the predetermined conditions. Solvents or agents used in conjunction with the test compound which are known by repeated test to be harmless may be omitted from the control.

Usually not less than two specimens of a given species are used for each test. In conducting these tests with a valuable species, particularly where the available specimens are relatively large, a single fish may be used in each test. Likewise, if desired, some tests may be made with two or more species of fish in a given tank. Unless the animals are killed sooner, each test covers a twenty-four hour period, during which an average of six observations are made.

The relative toxicity of O-ethyl-S-pentachlorophenyl-thiolcarbonate to larval lampreys and four species of fresh water game fish at various concentrations of the chemical under these conditions is shown in Table 1.

Table 1

TESTS AT INDICATED CONCENTRATIONS WERE CONDUCTED FOR A 24-HOUR PERIOD AT A WATER TEMPERATURE OF 55° F.

| Concentration in parts per million | Mortality (percentage of total test animals) | | | | |
| --- | --- | --- | --- | --- | --- |
| | Larval lampreys | Rainbow trout | Brown trout | Brook trout | Smallmouth bass |
| 0.5 | 45.9 | 0.0 | | | |
| 1.0 | 100.0 | 5.2 | 7.9 | 0.0 | 0.0 |
| 2.0 | 98.0 | 2.1 | 6.2 | 0.0 | 0.0 |
| 2.5 | 97.9 | 0.0 | | | 0.0 |
| 3.0 | 97.3 | 2.6 | 56.2 | 0.0 | 0.0 |
| 4.0 | 100.0 | 8.2 | 72.9 | 4.1 | 0.0 |
| 5.0 | 95.9 | | 79.1 | 6.3 | 0.0 |
| 6.0 | | | 64.6 | 16.6 | 0.0 |
| 7.0 | | | 81.2 | 25.0 | 0.0 |
| 8.0 | | | | 39.6 | 4.1 |
| 9.0 | | | | 91.5 | 4.1 |
| 10.0 | | | | | 4.1 |

EXAMPLE 2

The biological activity of O-ethyl-S-pentachlorophenyl-thiol-carbonate was tested at various concentrations following the procedure outlined under Example 1, except that the tests were conducted at 45° F. and none were made using smallmouth bass. The results of these tests are given in Table 2.

Table 2

TESTS AT INDICATED CONCENTRATIONS WERE CONDUCTED FOR A 24-HOUR PERIOD AT A WATER TEMPERATURE OF 45° F.

| Concentration in parts per million | Mortality (percentage of total test animals) | | | |
| --- | --- | --- | --- | --- |
| | Larval lampreys | Rainbow trout | Brown trout | Brook trout |
| 0.5 | 70.8 | | | |
| 1.0 | 85.4 | | | |
| 2.0 | 100.0 | | | |
| 3.0 | 100.0 | | 4.1 | |
| 5.0 | | | 47.9 | |
| 7.0 | | 0.0 | 66.6 | 8.2 |
| 9.0 | | 22.9 | | 4.1 |
| 11.0 | | 85.2 | | 31.3 |
| 13.0 | | | | 37.9 |

EXAMPLE 3

The utility of O-ethyl-S-pentachlorophenyl-thiolcarbonate as a lampricide was further demonstrated in a series of tests under conditions similar to those for the tests in Example 2, except that the temperature was maintained at 35° F. The data from these tests are set forth in Table 3.

Table 3

TESTS AT INDICATED CONCENTRATIONS WERE CONDUCTED FOR A 24-HOUR PERIOD AT A WATER TEMPERATURE OF 35° F.

| Concentration in parts per million | Mortality (percentage of total test animals) | | | |
| --- | --- | --- | --- | --- |
| | Larval lampreys | Rainbow trout | Brown trout | Brook trout |
| 1.0 | 22.9 | | | |
| 2.0 | 43.8 | | | |
| 3.0 | 100.0 | | | |
| 5.0 | | | 8.2 | |
| 7.0 | | 2.1 | 8.2 | 6.2 |
| 9.0 | | 31.3 | 20.8 | 4.1 |
| 11.0 | | 68.7 | 58.2 | 2.1 |
| 13.1 | | | | 12.5 |

Although the solubility of O-ethyl-S-pentachlorophenyl-thiolcarbonate in water is extremely low, it is soluble in acetone and by appropriate dilution of a stock solution in acetone, the low concentrations required for these tests were readily and accurately secured.

As shown by Tables 1 through 3, the toxicity of O-ethyl-S-pentachlorophenyl-thiolcarbonate to desirable species of fish diminishes markedly as the water temperature is lowered. This is in accord with the general observations of ourselves and other workers in this field that the effect of poisons and narcotic substances upon fishes decreases as the water temperature declines to low levels. This is attributed to a reduction in metabolic rate which accompanies the declining temperature of the surrounding medium.

In contrast, however, there is only a moderate change in toxicity of this compound to the sea lamprey larvae with change in temperature. The differential between substantially 100% kill of larvae and any significant mortality of other fish therefore is increased as the water temperature is lowered.

The complete efficacy of O-ethyl-S-pentachlorophenyl-thiolcarbonate at a temperature just above the freezing point greatly enhances the practical utility of this compound for combatting the sea lamprey in the Great Lakes. It is especially desirable to apply the larvicide to streams during the "cold" seasons, that is late fall, winter and early spring. During this period, streams are generally at their lowest volume and minimum quantities of the chemical would be required to treat any given watershed. In addition to the resulting lower cost of treatment, the application of the larvicide during the "cold" season involves minimum possible conflicts with recreational interests such as fishing, swimming, boating, and camping.

However, it should be understood that our invention is not limited to cold weather operations. The increased toxicity of O-ethyl-S-pentachlorophenyl-thiolcarbonate to other fishes, as water temperature rises, may be disregarded for all species except the brown trout. Furthermore, the increased susceptability of brown trout to this substance at the higher temperatures, as a practical matter, does not limit its application since this species does not inhabit the majority of the streams most heavily infested with the lamprey larvae.

The optimum range of concentration is from about one to three parts of O-ethyl-S-pentachlorophenyl-thiolcarbonate per million parts of water. Within this range there is substantially 100% kill of lamprey larvae with no significant effect upon desirable species of aquatic life. It should be noted, however, that mortality of other fish (except brown trout) is not excessive even at concentrations of four and five parts per million at warmer water temperatures and is equally negligible at concentrations as high as six and seven parts per million in colder water. Therefore, while the preferred range of concentrations is from one to three parts per million, it will be understood that our invention is not limited thereto and that sea lamprey larvae may be treated in their natural habitats with concentrations of O-ethyl-S-pentachlorophenyl-thiolcarbonate up to and including seven parts per million without departing from the spirit of our invention.

In combatting the lamprey in accordance with our invention, it is desirable that the O-ethyl-S-pentachlorophenyl-thiolcarbonate be added to the stream and/or its tributaries sufficiently above the known habitats of the larvae so that the concentrations will be substantially uniform throughout the relatively quiet water covering the mud banks in the lower reaches. Thus the natural flow and movement of the water facilitates the dispersion and mixing of the chemical and reduces the amount of labor and equipment otherwise needed for securing and maintaining the desired conditions.

In treating a stream, the O-ethyl-S-pentachlorophenyl-thiolcarbonate may be added directly to the water in the form of a fine powder, with or without suitable wetting or conditioning agents to facilitate dispersal and/or solution. Alternatively, the compound may be added in liquid form, as solutions, suspensions, or emulsions. In general aqueous solutions or dispersals are preferred as the feeding and mixing are more readily effected.

The O-ethyl-S-pentachlorophenyl-thiolcarbonate may be dissolved in acetone or other water miscible solvent or it may be added in the form of a concentrated aqueous suspension prepared from solutions in acetone or the like.

Any suitable form of automatic proportioning device may be used for the addition of the chemical to the stream in predetermined amounts. The number and location of these will depend upon the volume and rate of stream flow, available sites, desired concentration, and the like. The principal requirement is that the O-ethyl-S-pentachlorophenyl-thiolcarbonate be maintained substantially within the predetermined range long enough to secure the desired lethal effect upon the developing larvae. Under most conditions, a minimum treatment period of twenty-four hours will insure satisfactory results. The concentration and uniformity of dispersion can be checked as often as desirable by any suitable chemical, physical, or biological method. Such methods are well known and can be readily adapted to the purposes of our invention.

A single treatment in accordance with the foregoing description and examples should substantially destroy all lamprey larvae inhabiting a given stream. Ordinarily, the treatment need only be made at four year intervals, but may be repeated at lesser intervals whenever it appears necessary.

It is to be understood that the foregoing description and examples are by way of illustration and that various changes and modifications may be made without departing from the spirit and scope of our invention which is defined in the following claims.

We claim:

1. A composition for combatting sea lamprey in the larval stage comprising O-ethyl-S-pentachlorophenyl-thiolcarbonate in an aqueous medium.

2. A composition for use in controlling sea lamprey larvae comprising a solution of O-ethyl-S-pentachlorophenyl-thiolcarbonate in an organic liquid medium.

3. A process for the control of *Petromyzon marinus* in the larval stage which comprises contacting the same with a compound having the formula

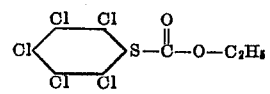

4. A process for combatting *Petromyzon marinus* which comprises subjecting the larval form of *Petromyzon marinus* to an effective concentration of O-ethyl-S-pentachlorophenyl-thiolcarbonate in an aqueous medium.

5. A process for controlling sea lampreys which comprises establishing in the waters over and in contact with larval sea lampreys a concentration of from one to seven parts per million of O-ethyl-S-pentachlorophenyl-thiolcarbonate.

6. A process according to claim 4 in which the concentration of O-ethyl-S-pentachlorophenyl-thiolcarbonate in the aqueous medium is three parts per million.

7. A process according to claim 5 in which the specified concentration of O-ethyl-S-pentachlorophenyl-thiocarbonate is maintained substantially throughout a period of at least twenty-four hours.

References Cited in the file of this patent

UNITED STATES PATENTS 2,790,267   Lee ------------------ Apr. 30, 1957

OTHER REFERENCES

Beilstein: Organische Chemie, Band XXIX, Erster Teil, p. 549, General Fromelregister ($C_1$–$C_{11}$).